United States Patent [19]

Weber

[11] Patent Number: 5,666,374

[45] Date of Patent: Sep. 9, 1997

[54] TUNABLE OPTICAL ARRANGEMENT

[75] Inventor: Jean-Pierre Weber, Stockholm, Sweden

[73] Assignee: Telefonaktiebolaget LM Ericsson, Stockholm, Sweden

[21] Appl. No.: 269,769

[22] Filed: Jul. 1, 1994

[30] Foreign Application Priority Data

Jul. 2, 1993 [SE] Sweden .................................. 9302294

[51] Int. Cl.$^6$ ...................................................... H01S 3/10
[52] U.S. Cl. ............................. 372/20; 372/100; 372/102
[58] Field of Search ...................................... 372/102, 100, 372/20, 19, 24, 108; 359/308, 313, 316; 385/37

[56] References Cited

U.S. PATENT DOCUMENTS

| 3,454,902 | 7/1969 | Giordmaine . | |
|---|---|---|---|
| 3,638,139 | 1/1972 | Ashkin et al. | 372/20 |
| 3,793,541 | 2/1974 | Ashkin et al. | 372/53 |
| 3,959,739 | 5/1976 | Hutcheson et al. | 372/102 |
| 3,970,963 | 7/1976 | Chester . | |
| 3,991,383 | 11/1976 | Hughes | 372/20 |
| 4,006,967 | 2/1977 | Kenan et al. | 359/286 |
| 4,217,561 | 8/1980 | Scifres et al. | 372/24 |
| 4,494,235 | 1/1985 | Guch, Jr. et al. . | |
| 4,660,204 | 4/1987 | Dewhirst et al. . | |
| 5,351,317 | 9/1994 | Weber . | |

FOREIGN PATENT DOCUMENTS

| 0 124 622 | 11/1984 | European Pat. Off. . |
| 242 445 | 10/1987 | European Pat. Off. . |
| 469 259 | 2/1992 | European Pat. Off. . |
| 525 752 | 2/1993 | European Pat. Off. . |
| 2 517 484 | 6/1983 | France . |
| 1 274 758 | 8/1968 | Germany . |
| 1076096 | 7/1967 | United Kingdom . |
| 2 169 721 | 7/1986 | United Kingdom . |
| WO86/05631 | 9/1986 | WIPO . |
| 88/07216 | 9/1988 | WIPO . |

OTHER PUBLICATIONS

M.B. Danailov et al., "A Novel Method of Ultrabroadband Laser Generation," *Optics Communications*, vol. 73, No. 3, pp. 235–238, Oct. 1, 1989.

M. K. Chin et al., "Generalized Blockaded Reservoir and Quantum-Well Electron-Transfer Structures (BRAQWETS): Modeling and Design Considerations for High Performance Waveguide Phase Modulators", IEEE J. of Quantum Electronics, vol. 28, No. 11, pp. 2596–2611 (Nov. 1992).

V. Jayaraman et al., "Demonstration of Broadband Tunability in a Semiconductor Laser Using Sampled Gratings," Appl. Phys. Lett., vol. 60, No. 19, pp. 2321–2323 (May 11, 1992).

V. Jayaraman et al., "Very Wide Tuning Range in a Sampled Grating DBR Laser," 13th IEEE Int'l Laser Conf., PD–11 (Sep. 21–25, 1992).

T. L. Koch, et al., "Semiconductor Lasers for Coherent Optical Fiber Communications," J. of Lightwave Technology, vol. 8, No. 3, pp. 274–293 (Mar. 1990).

M. Schilling et al., "Integrated Interferometric Injection Laser: Novel Fast and Broad-Band Tunable Monolithic Light Source," IEEE J. of Quantum Electronics, vol. 27, No. 6, pp. 1616–1624 (Jun. 1991).

(List continued on next page.)

*Primary Examiner*—Rodney B. Bovernick
*Assistant Examiner*—Robert E. Wise
*Attorney, Agent, or Firm*—Burns, Doane, Swecker & Mathis, L.L.P.

[57] ABSTRACT

An optical device which comprises at least one first passive or active element and an integrated grating arrangement. The device furthermore comprises a tuning device for controlling and changing the angle of incidence of a beam incident to the grating arrangement. The tuning devices comprises a variable index prism arranged between said first active or passive element and the grating arrangement.

4 Claims, 4 Drawing Sheets

OTHER PUBLICATIONS

J.B.D. Soole et al., "Multistripe Array Grating Integrated Cavity (Magic) Laser: A New Semiconductor Laser for WDM Applications," Electronics Letters, vol. 28, No. 19, pp. 1805–1807 (Sep. 10, 1992).

N. Takato et al., "Silica–Based Integrated Optic Mach–Zehnder Multi/Demultiplexer Family with Channel Spacing of 0.01–250 nm," IEEE J. on Selected Areas in Communications, vol. 8, No. 6, pp. 1120–1127 (AUG. 1990).

Y. Tohmori et al., "Ultrawide Wavelength Tuning with Single Longitudinal Mode by Super Structure Grating (SSG) DBR Lasers," 13th IEEE Int'l Laser Conf., paper O–6 (Sep. 21–25, 1992).

J.–P. Weber, "Optimization of the Carrier–Induced Effective Index Change in InGaAs/InP Waveguides—Application to Tunable Bragg Filters," IEEE J. Quantum Electronics (Dec. 1992).

J. E. Zucker et al., "Quaternary Quantum Wells for Electro–Optic Intensity and Phase Modulation at 1.3 and 1.55 μm," Appl. Phys. Lett, vol. 54, No. 1, pp. 10–12 (Jan. 2, 1989).

TUNABLE OPTICAL ARRANGEMENT

BACKGROUND

The present invention relates to a tunable optical arrangement, and more specifically to a device for tuning an input beam to a desired frequency.

BACKGROUND

In modern communication, tele-communication, datacommunication, etc., but also in other systems, the demand for tunable devices is great. The capacity of already existing as well as future optical fibre lines can be increased by introducing wavelength division multiplexing (WDM). Systems using WDM have the capability of using the large wavelength domain (or frequency domain) which is available in an optical fibre by assigning different wavelengths to different channels. It is important that the system is as flexible as possible. An important factor is to be able to select the lasing wavelength (i.e. the wavelength at which the laser effect occurs) in an integrated device and to be able to e.g. obtain a precise selection of those wavelengths which are required by the system. One kind of wavelength division multiplexing system comprises the so called high density wavelength division multiplexing systems. Generally, it is important for a number of different applications in one and the same kind of system as well as in widely different systems.

A number of devices which are tunable in one way or another are known. Examples of tunable devices are e.g. tunable lasers and tunable filters. It is advantageous in e.g. coherent wavelength division multiplexing communication systems to use devices which are tunable whereby the system becomes more flexible. E.g. it is useful to have lasers which can be tuned to the wavelength of different channels instead of having one laser with a fixed wavelength for each channel. It is advantageous to at least have some continuous tuning range around each channel in order to precisely adjust the wavelength.

As far as lasers are concerned the tunable lasers may in general be divided into three different categories of tunable semiconductor lasers.

The first category relates to so called external cavity lasers.

For a number of applications these are however not very practical. External cavity lasers are e.g. described in EP-A-525 752 and EP-A-242 445.

The second category of tunable semiconductor lasers make use of tunable Bragg gratings. In T. L. Koch and U. Koren, "Semiconductor lasers for coherent optical fibre communications", J. Lightwave Technol., vol. 8 (3), March 1990, pp 274–293, two-section and three-section distributed Bragg reflector (DBR) lasers are shown. The same reference furthermore describes so called multisection distributed feedback (DFB) lasers. Further examples of tunable lasers of the second category are disclosed in V. Jayaraman et al, "Demonstration of broadband tunability in a semiconductor laser using sampled gratings", Appl. Phys. Lett., vol 60 (19), 11 May 1992, pp 2321–2323; V. Jayaraman et al, "Very wide tuning range in a sampled grating DBR laser", 13th IEEE International laser conference, Sep. 21-25, 1992, Post-deadline paper 11; Y. Tohmori et al, "Ultrawide wavelength tuning with single longitudinal mode by super structure grating (SSG) DBR laser", 13th International laser conference, Sep. 21-25, 1992, Paper 0–6. These lasers suffer from the drawback of having limited tuning ranges.

A third category of tunable semiconductor lasers comprises the so called $C^3$-laser which also is described in the first reference mentioned above, T. L. Koch and U. Koren, "Semiconductor lasers for coherent optical fibre communications", J. Lightwave Technol., vol. 8 (3), March 1990, pp 274–293, and the so called Y-junction laser which is described in M. Schilling et al, "Integrated interferometric injection laser: Novel fast and broadband tunable monolithic light source", IEEE J. Quantum Electron., vol. 27 (6), June 1991, pp 1616–1624. None of the known devices works however in a completely satisfactory way. For example, the so called $C^3$-laser is difficult to reproduce as well as difficult to control. Also the Y-junction lasers are difficult to control. One tunable laser device is the so called MAGIC-laser disclosed in J. B. D. Soole, K. Poguntke, A. Scherer, H. P. LeBlanc, C. Chang-Hasnain, J. R. Hayes, C. Caneau, R. Bhat and M. A. Koza, "Multistripe array grating integrated cavity (MAGIC) laser: a new semiconductor laser for WDM applications", Electronics Lett., vol. 28 (19), 10 Sep. 1992, pp 1805–1807. Therein the lasing wavelength in an integrated device is selected by using a diffraction grating in a Rowland circle configuration as one of the mirrors. This in a way forms an integrated version of an external cavity laser as referred to above, but in which the external cavity is replaced by a slab waveguide which confines the light in one direction whereas it allows the light to diffract in the transverse direction. The semiconductor laser is formed by monolithical integration of an array of active stripes for the passive planar waveguide bearing an etched diffraction grating. Laser emission occurs from different stripes at different, precisely predetermined wavelengths. In this manner, the lasing wavelength may be accurately set at the desired state. As compared to the above discussed so called external cavity lasers, active gain stripes at different positions in the form of an array are used in combination with a fixed integrated grating, instead of a single active element and a rotating grating. The grating is fabricated by etching through the slab waveguide and adapted to the position of the exposed side wall. However, the lasing may only occur at a discrete number of wavelengths, which number is equal to the number of waveguide stripes, and furthermore, for each wavelength the output signal appears at a different stripe which is not very practical.

SUMMARY

The object of the present invention is to provide a tunable device which can easily be tuned, which is easy to control and reproduce, and which is easy to apply for different functions and different systems. It is also an object of the invention to provide a device, the tuning range of which may be large, and which is cheap and easy to produce and to handle. A further object of the invention is to provide a tunable device wherein, in the case of a laser, the lasing can be caused to occur continuously not only at a discrete number of wavelengths. A further object is to provide a device and an arrangement wherein only one gain stripe is needed so that the output signal for a number of wavelengths appears at one and the same stripe.

This and other objects are achieved through an arrangement having at least a first passive or active element and tuning means for controlling the angle of incidence of an input beam on a grating arrangement.

Further objects and advantages with the present invention will be apparent from the following description.

According to preferred embodiments the grating arrangement may comprise one, two or more fixed gratings. The device may also comprise a mirror arrangement which according to one embodiment is arranged before the variable prism to direct an incident beam thereto. It may also be arranged after a final grating to direct the outgoing beam to a second element or in between different gratings. It is advantageous to apply the device or arrangement with a wavelength division multiplexing system.

According to preferred embodiments the device or the arrangement may be used for tuning to the wavelength of different channels continuously in a range around each channel for precise adjusting of the wavelength or continuously for the whole range of wavelengths.

According to a preferred embodiment the variable index prism having a variable refractive index is made by changing the refractive index of a region of a slab waveguide. Preferably the borders of this region where the beam enters and leaves the region are straight. According of an exemplary embodiment the variable index prism has a form of e.g. a triangle.

According to different embodiments, the refractive index of a region may be changed by e.g. carrier injection, carrier depletion or by use of a so called BRAQWET-structure or by temperature tuning or through an application of quantum confinement Stark effect. According to a particular embodiment the device comprises a laser. Preferably the first element comprises an active gain stripe. More particularly, the grating arrangement may comprise one fixed grating wherein by changing the angle of incidence to the grating the wavelength of the retro-reflected light is changed, the wavelength change $\Delta\lambda$ being approximately $$\Delta\lambda = -\frac{2nd}{m} \cos\theta_1 \frac{P}{D} \psi$$

for small deviation angles $\psi$ where n is the refractive index, m is the grating diffraction order, d is the grating period, $\theta_1$ is the angle between the incident beam and the normal to the grating P and D are dimensions of the particular device. In this embodiment the prism has to be placed close to the grating to get the largest tuning range. However, if a better wavelength selectivity of the reflected beam is desired, a large number of grating periods must be covered. This would in the above mentioned embodiment give rise to a large prism size which sometimes might be inconvenient. According to further embodiments the grating arrangement comprises multiple gratings wherein the change in wavelength the retro-reflected light is given by $$\Delta\lambda = -\left(\frac{\cos\theta_2}{\cos\theta_3} \frac{m_2}{2nd_2} + \frac{m_1}{nd_1}\right)^{-1} \cos\theta_1\psi$$

Through the use of multiple gratings it is possible to decrease the beam width and thus also the size of the prism while still keeping a good wavelength resolution.

According to a further embodiment of the invention the device comprises a filter, particularly a reflection filter. According to one embodiment the first element may be a passive waveguide but the first element may also according to a further embodiment be a gain stripe separated from a second gain stripe, forming input and output, respectively, wherein the input and the output end of the gain stripes comprise an anti-reflection coating. Preferably the input and the output are separated from each other and more particularly the first element and the second element form different waveguides or gain stripes.

BRIEF DESCRIPTION OF THE DRAWINGS

The invention will in the following be further described by way of examples in a non-limiting way with reference to the appended drawings, wherein.

DETAILED DESCRIPTION

Figure 1:
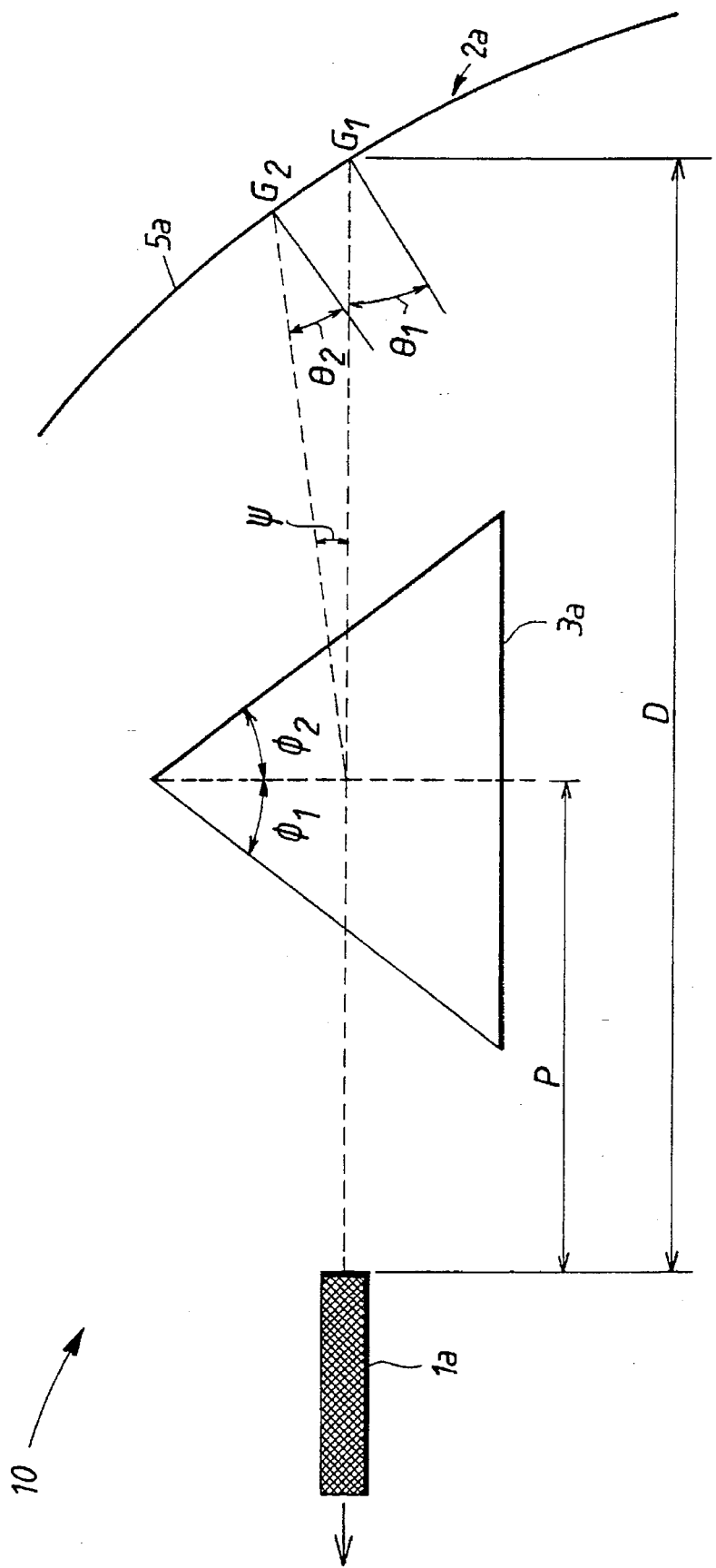
FIG. 1 illustrates a tunable laser with one grating.

FIG. 1 illustrates a tunable laser 10 comprising a first active element 1a in the form of a gain stripe. When the gain stripe 1a is injection pumped, lasing (i.e. a laser effect) occurs, the lasing frequency being determined by the change by the grating of the angle of incidence of the beam, i.e. the change of wavelength of the retro-reflected light. Between the gain stripe 1a and a fixed grating 5a, in this case forming the grating arrangement 2a, a so called variable prism 3a is arranged. This variable prism 3a forms the wavelength tuning element with a variable refractive index. Due to its variable refractive index the deflection angle of the beam incident to the grating 5 will be variable.

Figure 2:
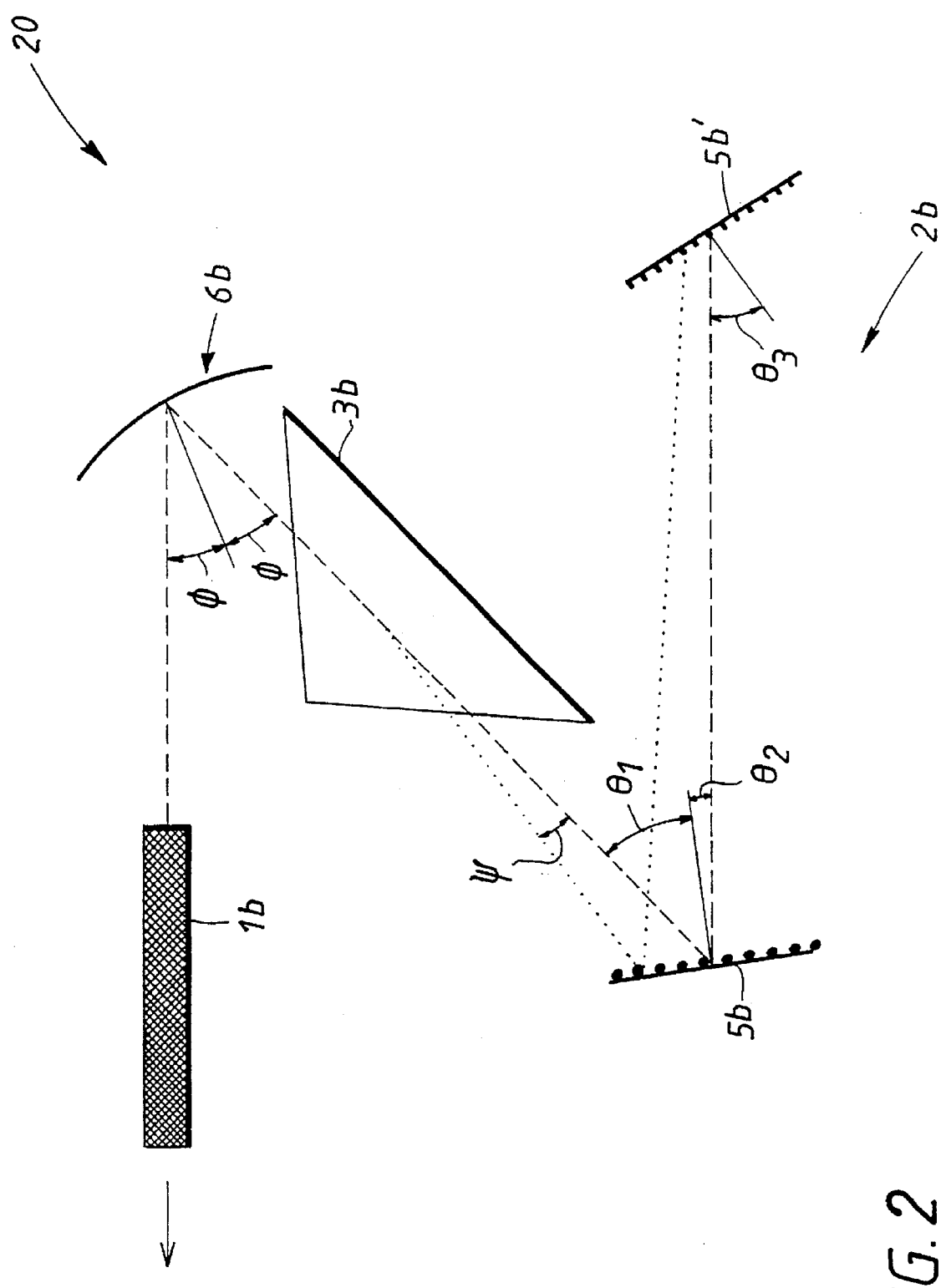
FIG. 2 illustrates a multi-grating tunable laser.

FIG. 1 illustrates a simple embodiment of the inventive concept. According to this embodiment having a grating arrangement 2 which merely comprises one single grating 5, the wavelength change will be $$\Delta\lambda = -\frac{2nd}{m} \cos\theta_1 \frac{P}{D} \psi$$

for small deviation angles $\psi$. Here n is the refractive index of the propagation medium, m is a grating diffraction order and d is the grating period. The distances P, D are illustrated in the figure, i.e. P is the distance from the input waveguide to the middle of the index prism and D is the distance from the input waveguide to the grating G and $G_2$ as defined in FIG. 1. In this particular embodiment however, the prism 3a has to be placed close to the grating 5 in order to get a tuning range which is as large as possible. FIGS. 1 and 2 define prism angles and $\psi$, as mentioned above, forms the deviation angle whereas $\theta1$ and $\theta2$ denote the angles which the beam forms with the normals to grating 5a, 5b. $\theta_2$ is the deviated beam angle, i.e. with an index change applied to the prism, and $\theta_1$ is the non-deviated beam angle, i.e. in the absence of induced changes of the index in the prism, as defined in FIG. 1. If, however, a better wavelength resolution of the reflected beam is required, the beam needs to cover a large number of grating periods. In order to achieve this, a large prism would be needed and this might in some instances be inconvenient e.g. due to space requirements, fabrications methods, etc.

An embodiment which overcomes this complication is shown in FIG. 2. The laser device 20 of FIG. 2 comprises a grating arrangement 2b comprising multiple gratings, in this case two gratings 5b, 5b'. Through the use of multiple gratings e.g. two gratings 5b, 5b') it is possible to decrease the width of the beam and also the size of the prism while maintaining a good wavelength resolution. A mirror 6b is arranged between the gain stripe 1b and variable prism. The incident beam is directed to the variable prism 3b by the mirror 6b after which the deviated beam impinges on the grating 5b and the grating 5b', in turn $\theta1$, $\theta2$ and $\theta3$ form the angles between the beams and the normal to the gratings 5b and 5b', respectively. In this case the wavelength change $\Delta\lambda$ is given by $$\Delta\lambda = -\left(\frac{\cos\theta_2}{\cos\theta_3}\ \frac{m_2}{2nd_2} + \frac{m_1}{nd_1}\right)^{-1}\cos\theta_1\psi$$

where $m_i$ are the diffraction orders of the gratings, and $d_i$ are the periods. The angles have already been defined above and in the figure.

The mirror and the gratings may be fabricated according to known methods e.g. according to the method as described in J. B. D. Soole, K. Poguntke, A. Scherer, H. P. LeBlanc, C. Chang-Hasnan, J. R. Hayes, C. Caneau, R. Bhat and M. A. Koza, "Multistripe array grating integrated cavity (MAGIC) laser: a new semiconductor laser for WDM applications", Electronics Lett., vol. 28 (19), 10 Sep. 1992, pp 1805–1807. The mirror and the gratings are in this case defined using standard lithography or electron beam lithography, and reactive ion etching is used to etch through the slab waveguide. A metal layer, e.g. Al, is deposited on the side wall to give a high reflectivity. The gain stripe may be fabricated by known standard diode laser techniques. As to the dimensions of the device, some values will be given merely as an illustration, and naturally a number of other possibilities and different sizes are possible. However, according to one embodiment, the gain stripes $1a$, $1b$ are between 200 µm and 1 mm long and have a width of about 1–5 µm. A simple laser 10 might have distance between the gain stripe $1a$ and the grating $2a$ approximately 1 mm or more and the beam width at the grating 5 would typically be of several hundred microns. This means the whole device 10 would be a few millimeters long and about 500 µm wide.

As to the second embodiment of the laser 20, the distance between the gratings and between the first grating $5b$ and the second grating $5b'$ and the mirror is in the order of 300–600 µm. In this case the whole device could be less than 1 mm long and have a width of about 400 µm.

Figure 3:
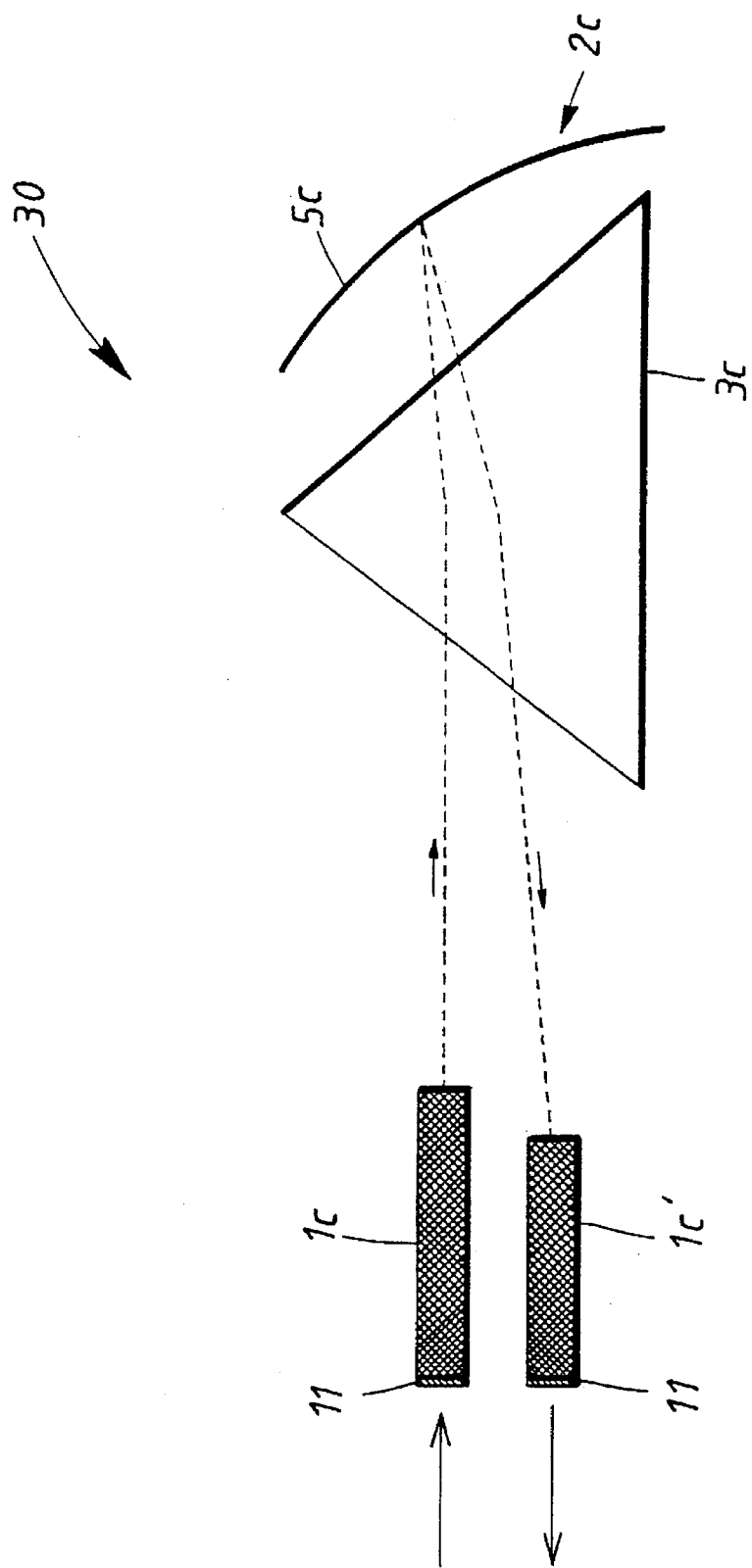
FIG. 3 illustrates a simple tunable (reflection) filter.

In FIG. 3 a further alternative of the invention is shown wherein the device forms a tunable reflection filter 30. This arrangement is similar to the arrangement of FIG. 1, where the first element is in the form of a gain stripe $1c$ which comprises an anti-reflection coating 11 on its outer end. In the embodiment shown in FIG. 3, the output is separated from the input and the beam is reflected in another waveguide, the second element $1c'$. Instead of a first and a second element $1c$; $1c'$ it is possible to replace those by passive waveguides.

According to a further embodiment (not shown) the devices illustrated in FIGS. 1 and 2 could be changed to form tunable reflection filters by the application of an anti-reflecting coating on the output end of the respective gain stripe. The gain stripe may in this case be used to compensate for the losses (while staying below the threshold) or it may be replaced by a passive waveguide. It can be shown that the filter passband would be approximately gaussian.

Figure 4:
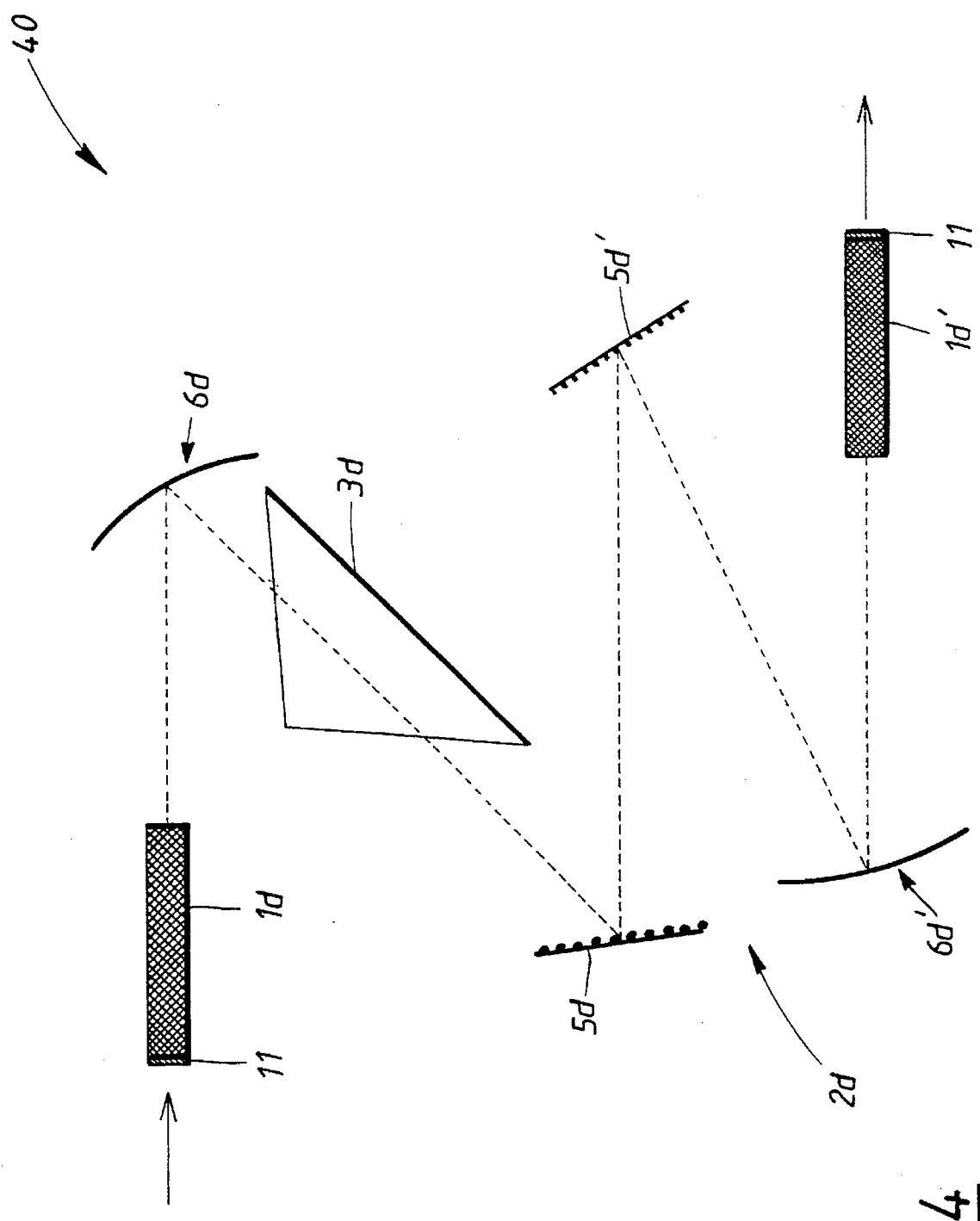
FIG. 4 illustrates a multi-grating (transmission) tunable filter.

FIG. 4 illustrates a multigrating filter comprising a grating arrangement $2d$ with a first grating and a second grating $5d$, $5d'$. It also comprises two mirror arrangements, a first mirror directing the incident beam onto the variable prism $3d$ and a second mirror directing the beam from the second grating $5d'$ to the second element $1d'$. The embodiments shown in FIGS. 3 and 4 thus illustrate two embodiments wherein the beam is reflected into another waveguide. The principle is the same as for the tunable laser, but instead of having retro-reflection as in the case of the laser, the beam will be reflected e.g. into another waveguide.

The variable index prism $3a$; $3b$; $3c$; $3d$ can be made in a number of ways. Generally it is made by changing the index of refraction of a region of a slab waveguide. The boundaries where the beam enters and leaves said region must be straight, but otherwise the shape and form of the region is not important. One advantageous form is a triangle but of course other forms and shapes are also possible as long as the boundaries are straight. In the case of a triangle, i.e. the embodiment as described in FIG. 1 and with the prism angles $\phi 1$ and $\phi 2$, the deviation angle $\psi$ is approximately given by $$\psi \approx -\frac{\Delta n}{n}(\tan\phi_1 + \tan\phi_2)$$

n being the refractive index outside of the prism and $(n+\Delta n)$ being the refractive index in the prism. This approximation is sufficient for small $\Delta n$.

The index of refraction in a region may be changed in different ways by the use of methods which are known per se. According to one method it is possible to use carrier injection wherein electrons and holes are injected through forward biasing of a p-i-n heterostructural change of the index of refraction. In InGaAsP/InP it is possible to obtain effective index changes on the order of −0.02 or more for injected carrier densities on the order of $2\times10^{18}$ cm$^{-3}$. This method is further described in J.-P. Weber, "Optimization of the carrier-induced effective index change in InGaAsP/InP waveguides—Application to tunable Bragg filters", submitted for publication in IEEE J. Quantum Electronics. With an effective index in the order of 3.25, $\Delta n/n$ will be approximately $-6.1\times10^{-3}$, this being the relative index change. For small index changes, the angles of deviation $\psi$ are proportional thereto and therefore this is a measure of the function of the method.

According to a further method, so called carrier depletion may be used. Therein the same p-i-n structure as for carrier injection (in InGaAsP/InP) is used, but with a doped material of a smaller bandgap it is possible to sweep carriers out of it by reverse biasing the diode structure. Reasonable doping levels are at maximum on the order of $10^{18}$ cm$^{-3}$. In this manner, material index changes of about +0.01 would be obtained, which would give effective index changes of about +0.005. If the effective index is in the order of 3.25, $\Delta n/n$ will be approximately $+1.5\times10^{-3}$.

According to a further method it is possible to use so called BRAQWETS (Blockaded Reservoir And Quantum-Well Electron-Transfer Structures), which are majority carrier devices (here electrons). This method is further described in M. K. Chin, T. Y. Chang and W. S. C. Chang, "Generalized Blockaded Reservoir And Quantum-Well Electron-Transfer Structures (BRAQWETS): Modeling and design considerations for high performance waveguide phase modulators", IEEE J. Quantum Electron., vol. 28(11), November 1992, pp 2596–2611. With the same effective index as above, $\Delta n/n$ will be approximately $+9.2\times10^{-4}$.

According to a further method, it is possible to use temperature tuning in InP and to obtain an index change. In J.-P. Weber, "Optimization of the carrier-induced effective index change in InGaAsP/InP waveguides—Application to tunable Bragg filters", submitted for publication in IEEE J. Quantum Electronics, we get $\partial n/\partial T=1.81\times10^{-4}$ [K$^{-1}$] for InP around 300K and $\partial n/\partial T=3.53\times10^{-4}$[K$^{-1}$] for 1.42 µm bandgap InGaAsP. In practice, this can be done by putting a heating resistance on top of the slab waveguide (with a dielectric layer for electrical insulation). Taking as an example a waveguide with 0.3 µm of 1.3 µm InGaAsP with InP cladding layers, the effective index change for a temperature rise from 300 K to 350 K would be about +0.01. This gives again an effective index in the order of 3.25, $\Delta n/n \approx 3.1\times10^{-3}$.

According to still a further method, temperature tuning in $SiO_2$ could be used. Instead of using a semiconductor material for all the elements, it is possible to use a hybrid fabrication technique with only the gain stripe in a semiconductor material and the rest in $SiO_2$. Tuning can then be obtained by changing the temperature with a heating resistance on top of the slab waveguide. For $SiO_2$, we have $\partial n/\partial T=1\times10^{-5}[K^{-1}]$. Thus, for a 50 K temperature rise, the refractive index will increase by about $5\times10^{-4}$. The refractive index is about 1.47, N. Takato, T. Kominato, A. Sugita, K. Jinguji, H. Toba and M. Kawachi, "Silicabased integrated optic Mach-Zender multi/demultiplexer family with channel spacing of 0.01–250 nm", IEEE J. Selected Areas in Communications, vol. 8(6), August 1990, pp 1120–1127, which gives $\Delta n/n \approx 3.4 \times 10^{-4}$.

Still another method is based on the quantum confined Stark effect. The energy level shifts due to the Stark effect in quantum wells causes changes of refractive index. These changes are a function of the detuning from the level, but are in the order of 0.01 for an electric field of about 100 kV/cm for InGaAsP wells with an InP substrate (see J. E. Zucker, I. Bar-Joseph, B. I. Miller, U. Koren and D. S. Chemla, "Quaternary quantum wells for electro-optic intensity and phase modulation at 1.3 and 1.55 μm", Appl. Phys. Lett., vol, 54 (1), 2 Jan. 1989, pp 10–12). This applies for light incident normal to the layers. In a waveguide, this is reduced by the confinement factor, so that at best half of that amount of the index change could be expected. This thus gives $\Delta n/n \approx 1.5 \times 10^{-3}$ (again for an effective index of 3.25). This effect however has a large wavelength dependence, which might cause problems. There is also an electro-absorption effect that accompanies the index change, but it decreases much faster with detuning than the index change does.

The invention shall not be limited to the shown embodiments but can be freely varied within the scope of appended claims.

What is claimed is:

1. A tunable optical arrangement, comprising:

an input element for providing an input beam to be tuned;

an integrated grating arrangement for selecting a wavelength of the input beam; and tuning means for controlling an angle of incidence of the input beam onto the grating arrangement, wherein the tuning means comprises a variable-refractive-index prism disposed between the input element and the grating arrangement and an index of refraction of a region of the variable-refractive-index prism is changed by a BRAQWET-structure.

2. A laser comprising:

an input element for providing input laser light to be tuned;

an integrated grating arrangement for selecting a wavelength of the input laser light; and tuning means for controlling an angle of incidence of the input laser light onto the grating arrangement, wherein the tuning means comprises a variable-refractive-index prism disposed between the input element and the grating arrangement and the input element comprises and active gain stripe;

wherein the grating arrangement comprises a fixed grating, and a change in wavelength ($\Delta\lambda$) of the input laser light is substantially give by the following expression:

$$\Delta\lambda = -\frac{2nd}{m} \cos\theta_1 \frac{P}{D} \psi$$

where n is refractive index, m is a grating order, d is a grating period, $\theta_1$ is the angle of incidence of the input laser light onto the grating, P is a distance from the input element to the middle of the variable-refractive-index prism, D is a distance from the input element to the grating, and $\Psi$ is a deviation angle.

3. A tunable optical arrangement, comprising:

an input element for providing an input beam to be tuned;

an integrated grating arrangement for selecting a wavelength of the input beam;

tuning means for controlling an angle of incidence of the input beam onto the grating arrangement, wherein the tuning means comprises a variable-refractive-index prism disposed between the input element and the grating arrangement;

wherein the grating arrangement comprises at least two gratings and a wavelength change ($\Delta\lambda$) of the input beam is given by the following expression:

$$\Delta\lambda = -\left(\frac{\cos\theta_2}{\cos\theta_3} \frac{m_2}{2nd_2} + \frac{m_1}{nd_1}\right)^{-1} \cos\theta_1 \psi$$

where $\theta_1$ is the angle of incidence of the input beam onto a first grating; $\theta_2$ is an angle between the input beam reflected from the first grating and a normal to the first grating; $\theta_3$ is an angle between the input beam reflected from the first grating and a normal to a second grating; $\Psi$ is a deviation angle; $m_1$ and $m_2$ are orders of the first and second gratings, respectively; n is a refractive index; and $d_1$ and $d_2$ are grating periods for the first and second gratings, respectively.

4. A tunable optical filter comprising:

an input element for providing an input beam to be tuned;

an integrated grating arrangement for selecting a wavelength of the input beam;

tuning means for controlling an angle of incidence of the input beam onto the grating arrangement, wherein the tuning means comprises a variable-refractive-index prism disposed between the input element and the grating arrangement;

wherein the input element is a gain stripe having an anti-reflection coating on an input end and is separated from a second gain stripe having an anti-reflection coating on an output end, the second gain stripe being an output element for receiving the input beam reflected by the grating arrangement.

* * * * *